(12) United States Patent
Arwood et al.

(10) Patent No.: US 7,048,298 B2
(45) Date of Patent: May 23, 2006

(54) UPWARD DEPLOYING INFLATABLE KNEE BOLSTER WITH MECHANICAL GUIDES

(75) Inventors: Robert Arwood, Fraser, MI (US); Eric Baumbach, Sterling Heights, MI (US); Robert Block, Clarkston, MI (US); John Cooper, Oxford, MI (US); Kaustubh Bedekar, Auburn Hills, MI (US); Pat Atkinson, Grand Blanc, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 129 days.

(21) Appl. No.: 10/666,247

(22) Filed: Sep. 22, 2003

(65) Prior Publication Data

US 2005/0062264 A1    Mar. 24, 2005

(51) Int. Cl.
*B60R 21/45* (2006.01)
*B60R 21/231* (2006.01)

(52) U.S. Cl. .............................. 280/730.1; 280/743.2; 280/752; 280/753

(58) Field of Classification Search ................ 280/727, 280/728.1, 730.1, 732, 743.1, 743.2, 751–753
See application file for complete search history.

(56) References Cited

U.S. PATENT DOCUMENTS

| | | | |
|---|---|---|---|
| 4,198,075 A * | 4/1980 | Kob et al. ................. | 280/753 |
| 4,948,168 A * | 8/1990 | Adomeit et al. ........... | 280/732 |
| 4,951,963 A | 8/1990 | Behr et al. | |
| 5,131,681 A | 7/1992 | Wetzel et al. | |
| 5,344,184 A | 9/1994 | Keller et al. | |
| 5,476,283 A | 12/1995 | Elton | |
| 5,496,066 A | 3/1996 | Hoffmann et al. | |
| 5,536,043 A * | 7/1996 | Lang et al. ................. | 280/753 |
| 5,775,729 A * | 7/1998 | Schneider et al. ........ | 280/730.1 |
| 5,931,493 A * | 8/1999 | Sutherland ................ | 280/730.1 |
| 6,283,508 B1 | 9/2001 | Nouwynck et al. | |
| 6,338,501 B1 | 1/2002 | Heilig et al. | |
| 6,378,902 B1 * | 4/2002 | Unger et al. ................ | 280/753 |
| 6,431,583 B1 | 8/2002 | Schneider | |
| 6,435,554 B1 * | 8/2002 | Feldman ................... | 280/743.2 |
| 6,517,103 B1 * | 2/2003 | Schneider ................. | 280/730.1 |
| 6,846,015 B1 * | 1/2005 | Meduvsky et al. ......... | 280/753 |
| 2003/0015861 A1 | 1/2003 | Abe | |
| 2004/0251670 A1 * | 12/2004 | Wang et al. ................ | 280/753 |

FOREIGN PATENT DOCUMENTS

| | | | |
|---|---|---|---|
| DE | 4243791 A1 * | 6/1994 | |
| JP | 04197847 A * | 7/1992 | |
| JP | 06032195 A * | 2/1994 | |

* cited by examiner

*Primary Examiner*—Paul N. Dickson
*Assistant Examiner*—Laura B. Rosenberg
(74) *Attorney, Agent, or Firm*—Lonnie Drayer

(57) ABSTRACT

A knee bolster for a vehicle has an air bag and an air bag inflator. The air bag has an inflated condition and a deflated condition. The air bag is attached to the knee bolster, which is moveable with the air bag. The knee bolster may move from an unactuated position when the air bag is in the deflated condition to an actuated position when the air bag is inflated. A guide structure, which is attached to the knee bolster directs the bolster along a linear path from the unactuated position to the actuated position.

12 Claims, 4 Drawing Sheets

UPWARD DEPLOYING INFLATABLE KNEE BOLSTER WITH MECHANICAL GUIDES

FIELD OF THE INVENTION

This invention relates to a knee bolster for a vehicle.

BACKGROUND OF THE INVENTION

In a vehicle crash, the knee of a vehicle occupant is frequently susceptible to injury. A significant number of knee injuries results from impact forces on the leg that cause the lower leg (tibia) to travel in an opposite direction to the path of the upper leg (femur). As a consequence of this motion, the tibia shears relative to the femur, causing ligaments and tendons in the knee to tear.

Existing knee bolsters fail to address this shearing effect. For example, one such design merely deploys an air bag in the vicinity of the knee of the occupant. However, such an air bag does not prevent movement of the knee relative to the tibia because the air bag contacts both the knee and the tibia in deployment.

An alternative knee bolster design uses a mechanical carriage to direct a padded cushion toward the knee of the vehicle occupant. This design advances the padded cushion through a telescoping support. The telescoping support expands through either a spring or a pyrotechnic force within the telescoping support. This alternative design does not offer the benefits of cushioning a vehicle impact with an air bag.

A need therefore exists for a knee bolster that uses an air bag to stop movement of the femur relative to the tibia.

SUMMARY OF THE INVENTION

The present invention uses an air bag to advance a knee bolster toward an anticipated location of a knee of a vehicle occupant. The air bag has a deflated condition and an inflated condition. The air bag is inflated by an air bag inflator. In contrast to existing designs, the inventive knee bolster uses a guide structure attached to the bolster to direct the bolster along a generally linear path toward the knee. In this way, the bolster may focus its cushioning effect on the knee rather than on both the knee and the tibia while still providing the cushioning effect from an air bag.

The guide structure may comprise a first member and a second member. The first member may extend from an unactuated position, when the air bag is deflated, to an actuated position, when the air bag is inflated, along a linear path relative to the second member. The first member may, in fact, be disposed within the second member and comprise a guide pin disposed within a guide tube. The guide pin may have a tapered surface to be received by another tapered surface of the guide tube.

The knee bolster may have an air bag housing to store the air bag in the deflated condition. The air bag may have a rear and a front area. The rear area is located closer to the air bag housing then the front area when the air bag is inflated. The knee bolster may be located at the front area of the air bag. A tether may attach the air bag to the knee bolster. Moreover, the knee bolster may be cushioned.

The guide structure may expand and retract between the actuated position and the unactuated position so that the air bag may be allowed to deflate once the vehicle occupant has contacted the knee bolster. Moreover, by placing the knee bolster at the front area of the air bag, the knee bolster may advance quickly and directly to the anticipated location of the knee. The vehicle occupant will also have the benefit of the full cushioning effect of the air bag at this location. In this way, the knee bolster may move with the knee of the vehicle occupant to collapse the air bag from front to rear for a full cushioning.

The air bag is thus inflated. Because the knee bolster is attached to the air bag, the knee bolster advances with the air bag. The knee bolster may be directed along a linear path to the anticipated location of a knee.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE INVENTION

Figure 1:
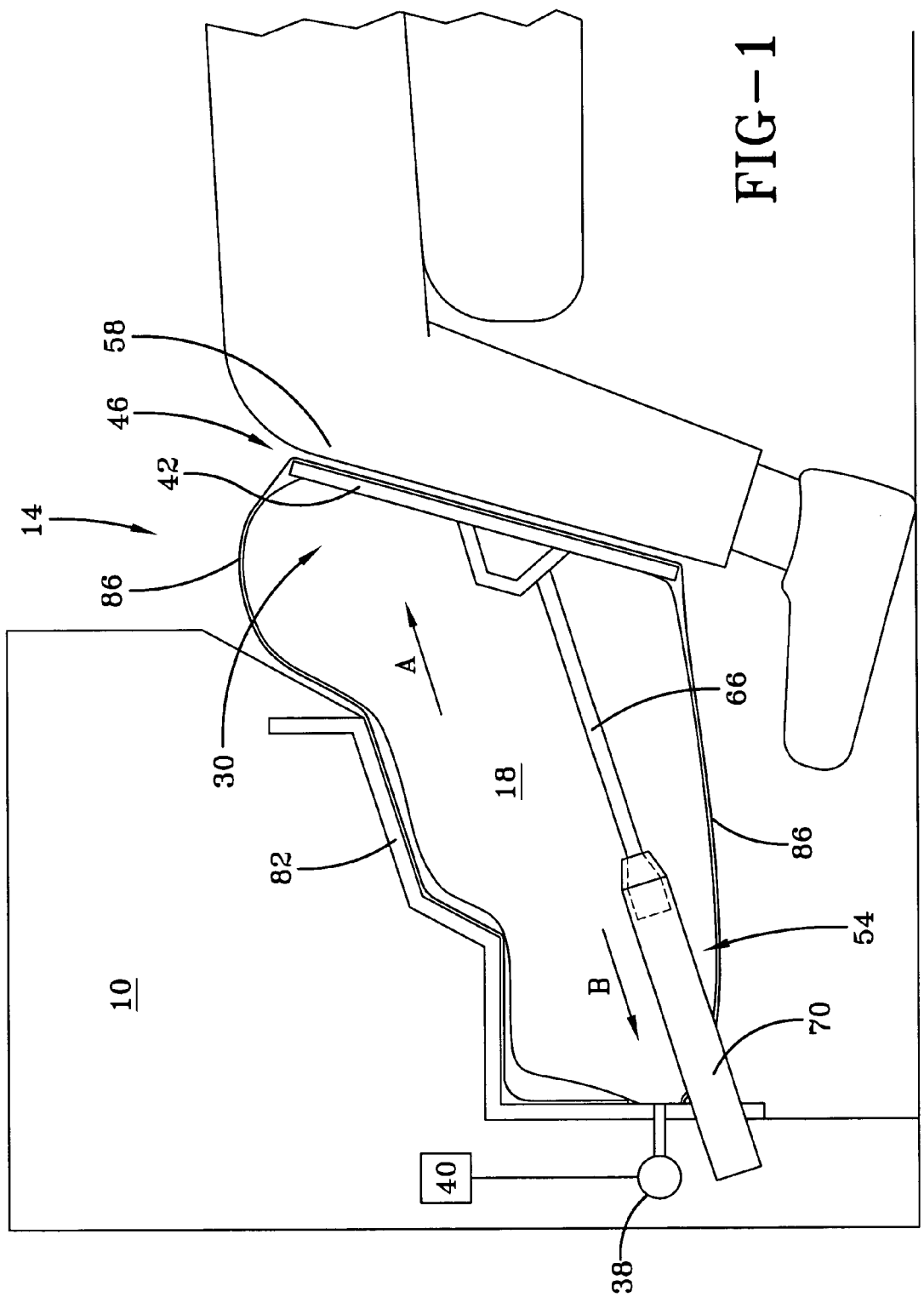
FIG. 1 illustrates a side view of the inventive knee bolster with an air bag in an inflated condition.

FIG. 1 illustrates a side view of inventive knee bolster 14. Inventive knee bolster 14 is located within vehicle 10, preferably under a vehicle instrument panel as shown. In FIG. 1, knee bolster 14 is shown with air bag 18 in inflated condition 30 while, in FIG. 2, air bag 18 is shown in deflated condition 34.

Inventive knee bolster 14 comprises air bag 18, air bag inflator 38, knee contact plate 42, and guide structure 54. In contrast to existing knee bolster designs, inventive knee bolster 14 uses guide structure 54 to direct knee contact plate 42 along linear path A to an anticipated location of a knee of a vehicle occupant 58.

Figure 2:
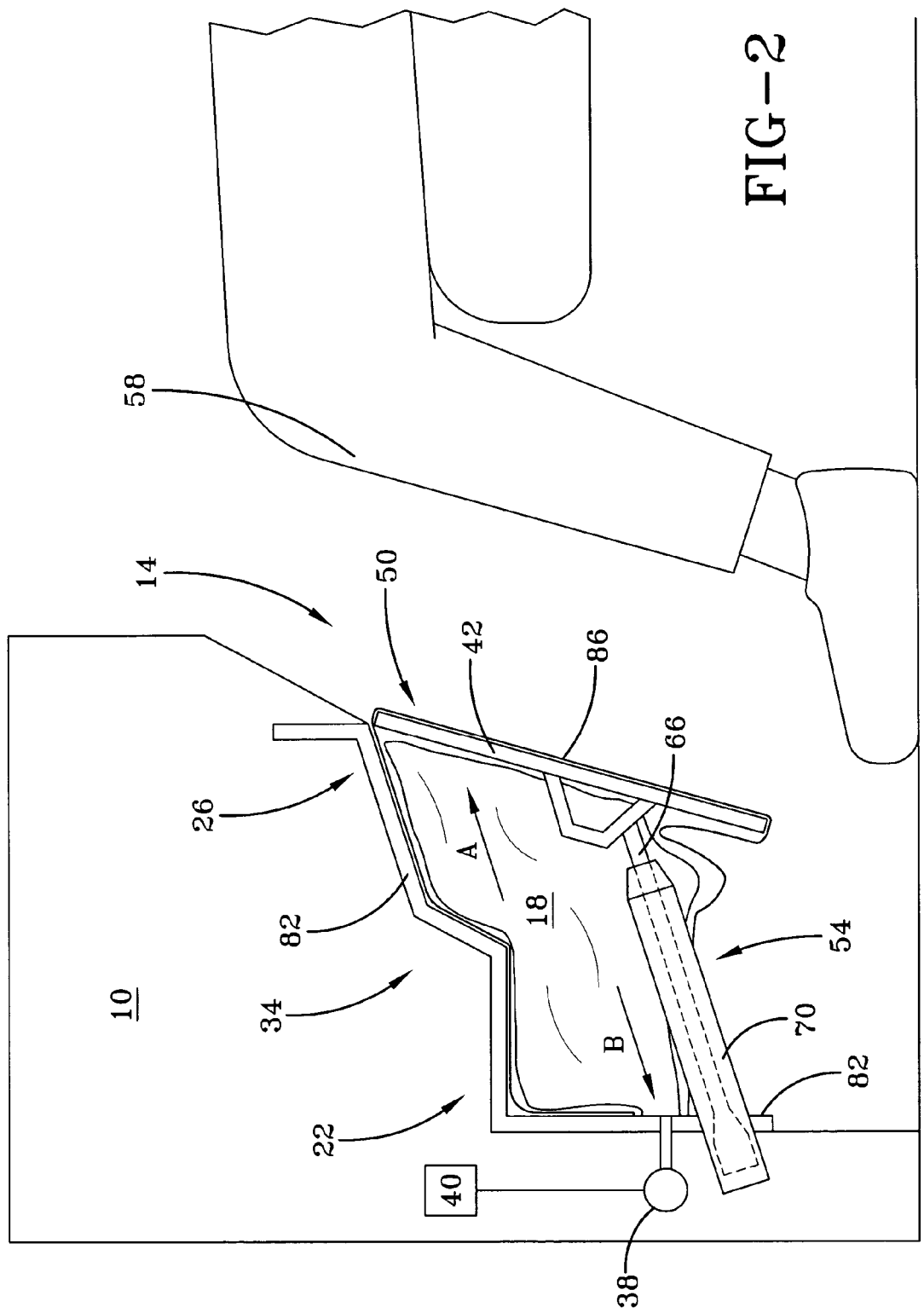
FIG. 2 illustrates a side view of the knee bolster with the air bag in a deflated condition.

The operation of inventive knee bolster 14 will now be explained. FIG. 2 illustrates knee bolster 14 with air bag 18 in deflated condition 34 and knee contact plate 42 in unactuated position 50. As shown, air bag 18 has rear area 22 and front area 26. The contact plate 42 is located at front area 26 of air bag 18 while air bag housing 82 is located near rear area 22 of air bag 18. Air bag 18 is further in communication with air bag inflator 38. In the event of a vehicle crash, crash detection system 40 may instruct air bag inflator 38 to inflate air bag 18. Air bag 18 is attached to knee contact plate 42 through tethers 86, which wrap around air bag 18 and knee contact plate 42. Knee contact plate 42 may be cushioned. When air bag 18 expands from deflated condition 34 (see FIG. 2) to inflated condition 30 (see FIG. 1), knee contact plate 42 moves from unactuated position 50 along linear path A to actuated position 46, an anticipated location of a knee of the vehicle occupant. When the knee of the vehicle occupant contacts knee contact plate 42, air bag 18 as well as knee contact plate 42 collapses in the direction of arrow B to thereby cushion any vehicle impact.

Figure 3:
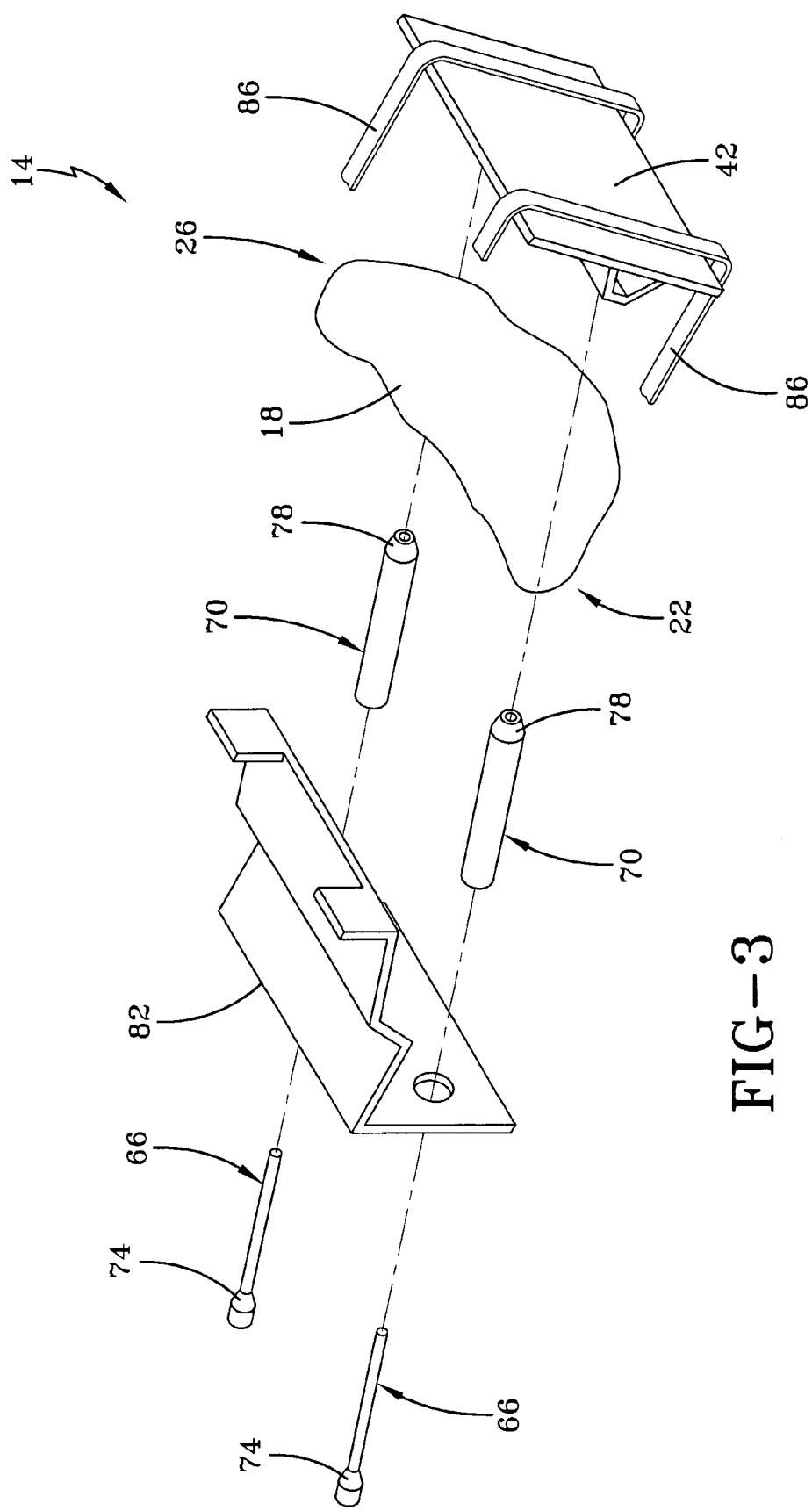
FIG. 3 illustrates an exploded view of the knee bolster of FIGS. 1 and 2.

FIG. 3 illustrates an exploded view of inventive knee bolster 14. As shown in FIG. 3, knee contact plate 42 is located at front area 26 of air bag 18. Rear area 22 of air bag 18 is located near air bag housing 82. Also, as shown, guide structure 54 comprises first member 66, here a guide pin, and second member 70, here a guide tube.

Figure 4:
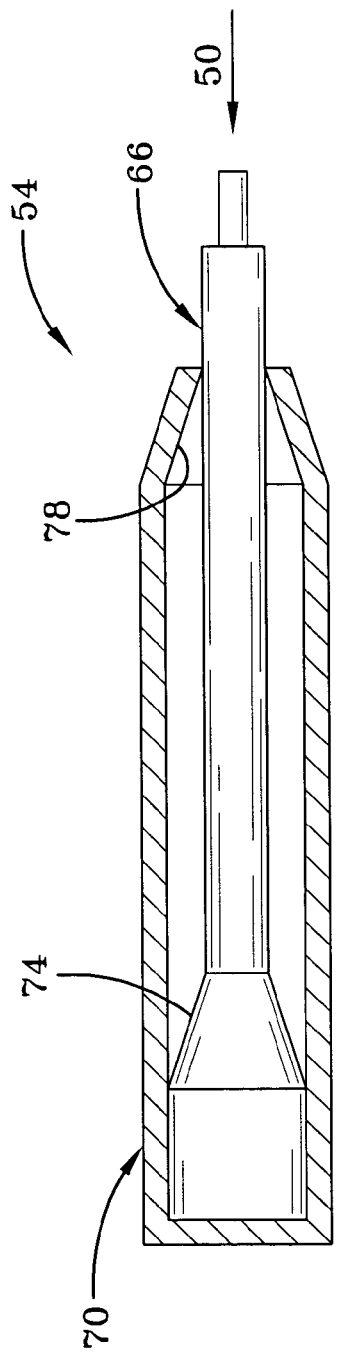
FIG. 4 illustrates the guide pin disposed within the guide tube in an unactuated position.
Figure 5:
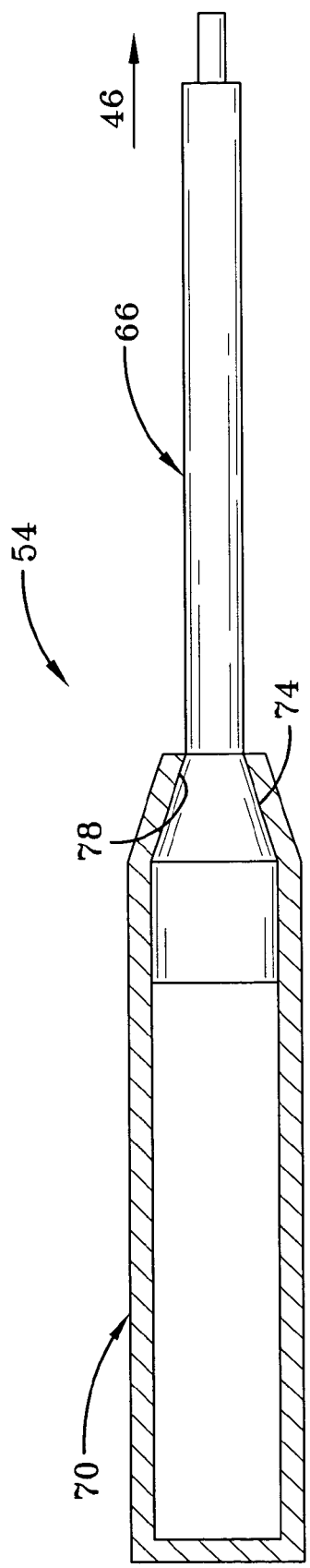
FIG. 5 illustrates the guide pin extended from the guide tube in an actuated position.

As shown in FIGS. 4 and 5, first member 66 is disposed within second member 70. In addition, first member 66 has first tapered surface 74 while second member 70 has tapered surface 78. In FIG. 4, with first member 66 at unactuated position 50, first tapered surface 74 is spaced away from second tapered surface 78. However, in FIG. 5, when guide structure 54 is in actuated position 46, first tapered surface 74 is in contact with second tapered surface 78 to smoothly retain first member 66 within second member 70. In this way, the force of actuation by air bag 18 may be distributed across tapered surfaces 74 and 78 rather than abruptly stopped.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A knee bolster assembly for a vehicle comprising:
   an air bag having an inflated condition and a deflated condition;
   an air bag inflator in communication with said air bag for filling said air bag to said inflated condition;
   a knee contact plate located in front of said airbag and movable by inflation of said air bag, said knee contact plate having an actuated position with said air bag in said inflated condition and an unactuated position with said air bag in said deflated condition;
   a tether attaching said air bag to said knee contact plate; and
   a guide structure attached to said knee contact plate, said guide structure for directing said knee contact plate along a generally linear path from said unactuated position to said actuated position, wherein said guide structure has a first member and a second member, said first member extendable from said unactuated position to said actuated position along said generally linear path relative to said second member, said first member being disposed within said second member, wherein said first member is a guide pin and said second member is a guide tube, said guide pin having a first tapered surface and said guide tube having a second tapered surface, said first tapered surface mating with said second tapered surface in said actuated position.

2. The knee bolster assembly of claim 1 wherein said guide structure directs said knee contact plate to an anticipated location of a knee of a vehicle occupant.

3. The knee bolster assembly of claim 1 including an air bag housing for storing said air bag in said deflated position.

4. The knee bolster assembly of claim 3 wherein said air bag has a rear area and a front area, said rear area disposed closer to an air bag housing than said front area in said inflated condition and wherein said knee contact plate is disposed at said front area.

5. The knee bolster assembly of claim 1 wherein said knee contact plate comprises a cushion.

6. The knee bolster assembly of claim 1 wherein said guide structure is expandable and retractable between said actuated position and said unactuated position.

7. A knee bolster assembly for a vehicle comprising:
   an air bag having an inflated condition and a deflated condition;
   an air bag inflator in communication with said air bag for filling said air bag to said inflated condition;
   an air bag housing for storing said air bag in said deflated condition;
   a knee contact plate located in front of said airbag movable by inflation of said air bag, said knee contact plate having an actuated position with said air bag in said inflated condition and an unactuated position with said air bag in said deflated condition;
   a tether attaching said air bag to said knee contact plate;
   wherein said air bag has a rear area and a front area, said rear area disposed closer to an air bag housing than said front area when in said inflated condition, said knee contact plate disposed at said front area,
   a guide structure attached to said knee contact plate, said guide structure for directing said knee contact plate along a generally linear path between said unactuated position to said actuated position, wherein said guide structure has a first member and a second member, said first member extendable from said unactuated position to said actuated position along said generally linear path relative to said second member, said first member being disposed within said second member, wherein said first member is a guide pin and said second member is a guide tube, said guide pin having a first tapered surface and said guide tube having a second tapered surface, said first tapered surface mating with said second tapered surface in said actuated position.

8. The knee bolster assembly of claim 7 wherein said guide structure directs said knee contact plate to an anticipated location of a knee of a vehicle occupant along a generally linear path.

9. The knee bolster assembly of claim 7 wherein said knee contact plate comprises a cushion.

10. The knee bolster assembly of claim 7 wherein said guide structure is expandable and retractable between said actuated position and said unactuated position.

11. A method of deploying a knee bolster assembly comprising the steps of:
   a) inflating an air bag from a deflated condition to an inflated condition;
   b) communicating a movement of the air bag from the deflated condition to the inflated condition to move a knee bolster located in front of said airbag by the inflation of said airbag;
   c) directing the knee bolster along a generally linear path to an anticipated location of a knee;
   d) moving the knee bolster from a first position to a second position along a generally linear path, the second position located closer to the anticipated location of the knee than the first position; wherein the step of moving and the step of directing includes the step of guiding using a guide structure, a guide structure attached to said knee bolster, said guide structure for directing said knee contact plate between said unactuated position to said actuated position, wherein said guide structure has a first member and a second member, said first member extendable from said unactuated position to said actuated position along said generally linear path relative to said second member, said first member being disposed within said second member, wherein said first member is a guide pin and said second member is a guide tube, said guide pin having a first tapered surface and said guide tube having a second tapered surface, said first tapered surface mating with said second tapered surface in said actuated position; and e) attaching a tether to said airbag and said knee bolster.

12. The method of claim 11 further comprising the step of stopping the movement of the knee bolster by engaging tapered surfaces on the first member and second member.

* * * * *